United States Patent
Sadarangani et al.

[11] Patent Number: 6,098,735
[45] Date of Patent: Aug. 8, 2000

[54] HYBRID DRIVE SYSTEM

[75] Inventors: Chandur Sadarangani, Västerås; Thomas Bäckström, Lidingö; Stefan Östlund, Stockholm, all of Sweden

[73] Assignee: ABB AB, Vasteras, Sweden

[21] Appl. No.: 09/029,319

[22] PCT Filed: Sep. 3, 1996

[86] PCT No.: PCT/SE96/01090

§ 371 Date: Apr. 29, 1998

§ 102(e) Date: Apr. 29, 1998

[87] PCT Pub. No.: WO97/09191

PCT Pub. Date: Mar. 13, 1997

[30] Foreign Application Priority Data

Sep. 4, 1995 [SE] Sweden ................................. 9503043

[51] Int. Cl.[7] .................................................. B60K 1/00
[52] U.S. Cl. ..................... 180/65.2; 180/165; 180/65.4; 180/65.6; 180/65.7; 318/375; 310/114; 290/40 C
[58] Field of Search ...................... 180/165, 65.1–65.3, 180/65.4, 65.6, 65.7, 65.8; 318/375, 376; 310/103, 114; 290/40 C; 322/16

[56] References Cited

U.S. PATENT DOCUMENTS

| | | | |
|---|---|---|---|
| 1,340,249 | 5/1920 | Pieper | 180/65.2 X |
| 3,789,281 | 1/1974 | Shibata . | |
| 3,796,278 | 3/1974 | Shibata | 180/65 |
| 4,282,947 | 8/1981 | Kemper | 180/165 |
| 4,533,011 | 8/1985 | Heidemeyer et al. | 180/65.2 |
| 4,625,823 | 12/1986 | Frank | 180/165 |
| 5,053,632 | 10/1991 | Suzuki et al. | 180/65.2 X |
| 5,327,992 | 7/1994 | Boll | 180/65.2 |
| 5,343,970 | 9/1994 | Severinsky | 180/65.6 X |
| 5,495,912 | 3/1996 | Gray, Jr. et al. | 180/165 |
| 5,675,203 | 10/1997 | Schulze et al. | 310/103 X |
| 5,697,466 | 12/1997 | Moroto et al. | 180/65.8 X |
| 5,846,155 | 12/1998 | Taniguchi et al. | 180/65.2 X |

FOREIGN PATENT DOCUMENTS

| | | |
|---|---|---|
| 41 18 678 A1 | 10/1992 | Germany . |
| 4118678 | 12/1992 | Germany ................ 180/165 |
| WO 94/19856 | 9/1994 | WIPO . |
| WO 95/01884 | 1/1995 | WIPO . |

*Primary Examiner*—Brian L. Johnson
*Assistant Examiner*—Bryan Fischmann
*Attorney, Agent, or Firm*—Pollock, Vande Sande & Amernick

[57] ABSTRACT

A hybrid drive system includes an internal combustion engine with an output shaft. An energy converter is connected to the output shaft via a coupling. The energy converter has first and second rotors which are rotatable at different speeds in relation to each other. At least one of the rotors is provided with one or more windings which are supplied with current from a current converter. The current converter is supplied with direct current from a direct current source. A transmission with variable gear ratio is coupled to one of the rotors. The transmission and the current converter cooperate via a control arrangement. The control arrangement comprises a control unit for controlling rotational speed and torque of the internal combustion engine and the energy converter.

18 Claims, 6 Drawing Sheets

▨ ENGINE DRIVE
◨ GENERATOR DRIVE

HYBRID DRIVE SYSTEM

BACKGROUND OF THE INVENTION

The present invention relates to a hybrid drive system and also relates to a control device for a hybrid drive system.

It is previously known to arrange a hybrid drive system as a vehicle drive. For example DE-A-41 18 678 relates to a hybrid drive system which comprises an internal combustion engine, an electric battery and a drive shaft which can be driven by the internal combustion engine and the battery. The transmission of the energy from the internal combustion engine and the energy of the battery to the drive shaft is effected via a slip ring motor or an energy converter comprising two concentric rotors. The outer rotor, which is joined to the shaft of the internal combustion engine, is provided with permanent magnets and the inner rotor, which is joined to the drive shaft, is provided with windings which are supplied with alternating current with the aid of slip rings, and which are coupled via a current-converter to the battery. The drive shaft is joined to a transmission of a fixed gear ratio which distributes the rotory movement of the drive shaft to the wheel axles of the vehicle.

U.S. Pat. No. 3,796,278 relates to a control system for a hybrid drive system which, in one embodiment, comprises an internal combustion engine, a current source, an electromagnetic clutch, an electric motor and a gearbox. The internal combustion engine is coupled to the electric motor via the electromagnetic clutch. The output shaft of the electric motor is joined to the gearbox. The electromagnetic clutch is constructed of two concentric rotors, one of which is provided with a winding supplied with current from the current source. The hybrid drive system is controlled by control units which regulate the current supply to the electric motor.

SUMMARY OF THE INVENTION

One purpose of the present invention is to achieve a hybrid drive system which makes possible optimal distribution of load between the internal combustion engine and the battery with regard to environmental requirements, such as the emissions of the system and with regard to operating life and operating characteristics.

An additional purpose is to achieve a hybrid drive system which makes driving possible by means of an electrically driven energy converter which is supplied by a power source and an internal combustion engine, the mean value over time of the expended energy from the power source being zero or nearly zero over a defined time period.

A further purpose of the invention is to achieve a control device which makes possible in an advantageous manner optimum operation of the hybrid drive system.

A hybrid drive system with the characteristic features of the present invention achieves exceptional efficiency in the internal combustion engine since the variable transmission in combination with the electrical energy converter permits increased freedom to allow the internal combustion engine to work at optimum rpm and torque.

BRIEF DESCRIPTION OF THE DRAWINGS

The invention will be described in more detail below with reference to a number of examples which are shown in the accompanying drawings.

DETAILED DESCRIPTION OF THE INVENTION

Figure 1:
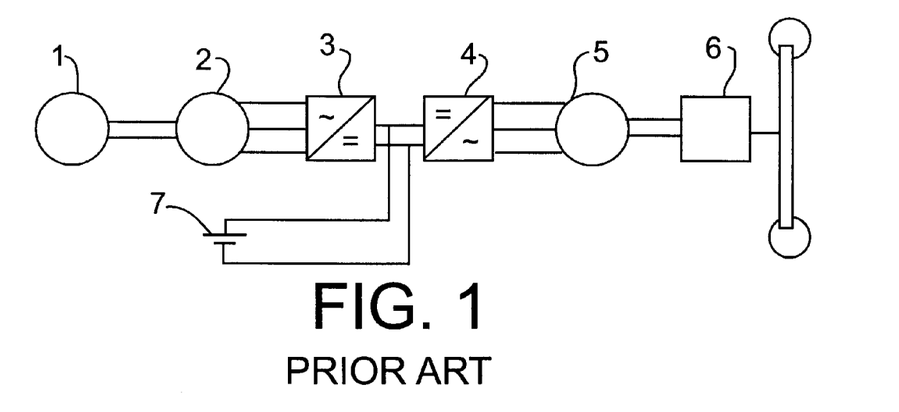
FIG. 1 shows a series hybrid system according to known technology.

Hybrid drive systems for vehicles can essentially be divided into two groups: series hybrid systems and parallel hybrid systems. Series hybrid systems, as shown in FIG. 1, consist essentially of an internal combustion engine 1, an AC generator 2, a rectifier 3, a current-converter 4, an AC motor 5, which in most cases is a cage induction motor, a gearbox 6 and a battery 7. The rpm and torque of the internal combustion engine 1 can in principle, in this system, be determined with complete freedom.

Figure 2:
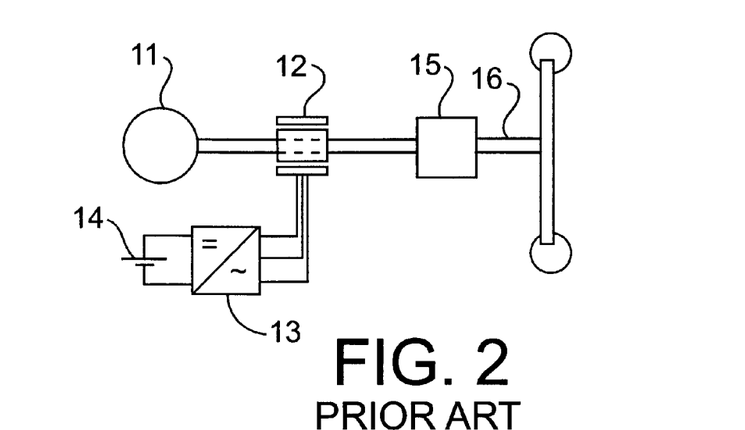
FIG. 2 shows a parallel hybrid system according to known technology.

Parallel hybrid systems are based, as can be seen in FIG. 2, on an internal combustion engine 11, an electric motor 12, a current-converter 13, a battery 14 and a gearbox 15. The speed of the internal combustion engine 11 and the electric motor 12 is the same in this system. Via the current-converter 13, the power of the battery 14 can be supplied to a drive shaft 16 and thus give added torque to the system.

Figure 3A:
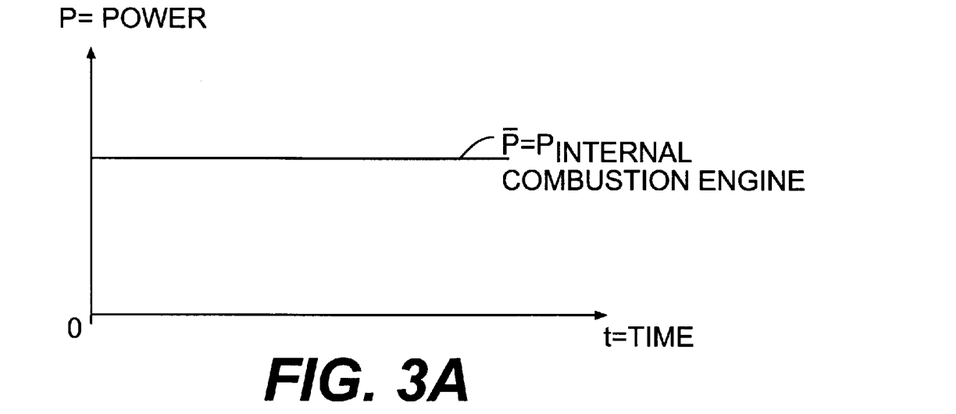
FIGS. 3A–3C show in diagram form how the outputs of the components in a hybrid drive system interact.
Figure 3B:
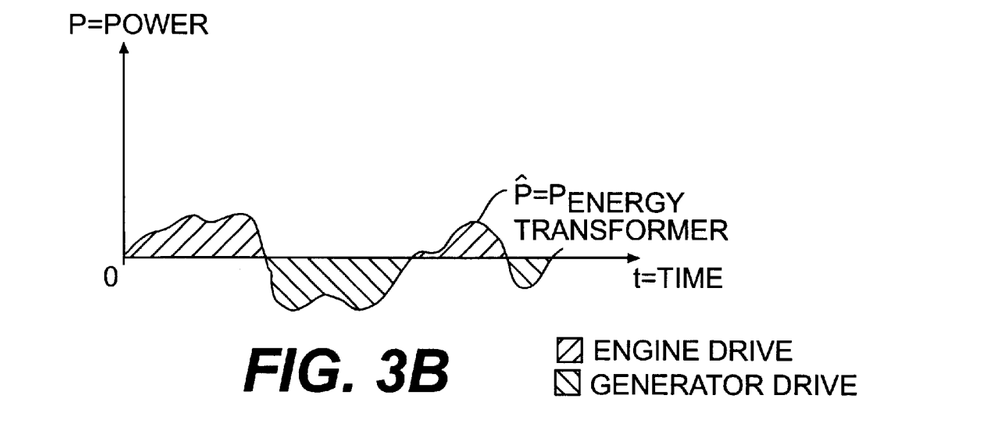
Figure 3C:
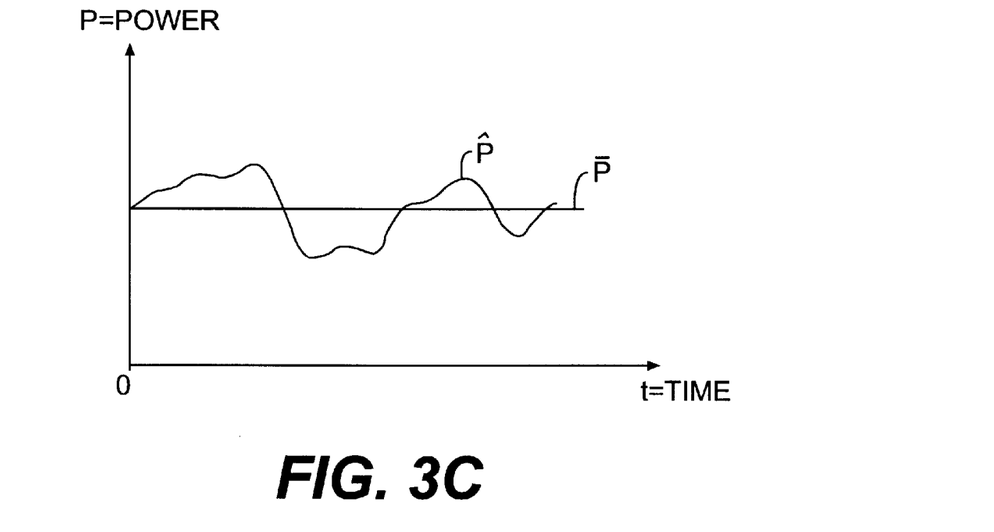

FIG. 3A shows a graph of an internal combustion engine producing constant power at a constant rpm. Since the power consumption of a vehicle varies, the energy converter will work as an electric motor when power is to be supplied to the drive wheels of the vehicle. When there is an excess of kinetic energy in the vehicle or when the vehicle is to be braked, power is sent to the battery which is thus charged, and in this case the converter acts as a generator. This is shown in FIG. 3B, with the areas above the time axis representing motor mode and the areas below the time axis representing generator mode for the converter. For hybrid operation, the internal combustion engine is set so that it provides a power corresponding to the mean power requirement for the type of operation in question. Any increase or decrease in power requirement is compensated with the aid of the converter, as shown in FIG. 3C.

Figure 4:
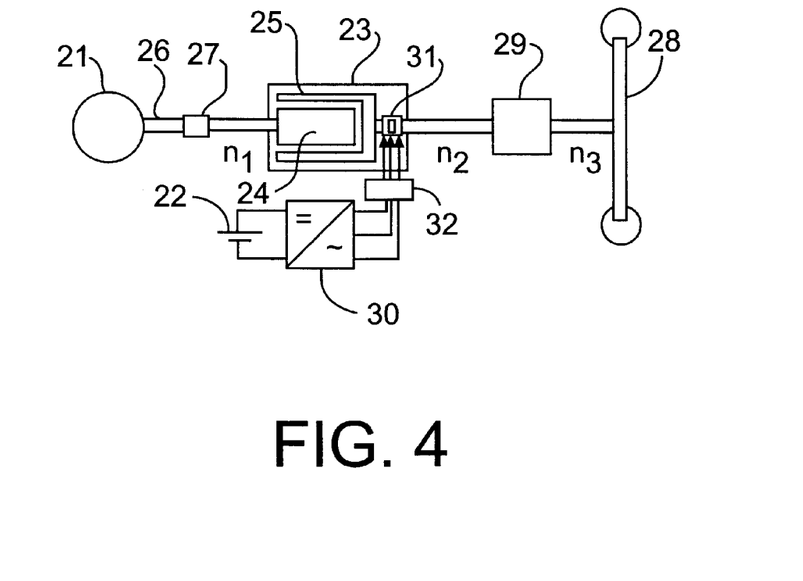
FIG. 4 is a schematic drawing of a hybrid drive system according to the invention.

FIG. 4 shows a schematic drawing of a hybrid drive system according to the invention where the hybrid drive system is a drive means for a wheeled vehicle. In the hybrid drive system, energy from the internal combustion engine 21 is combined with energy from a source of direct current, such as a battery 22, in an energy converter 23, which is provided with two concentric rotors 24, 25, having individual shafts. The first rotor 24, which can be the inner rotor, is coupled mechanically to the output shaft 26 of the internal combustion engine 21, and the output shaft 26 can be locked or braked by a mechanical or electrical clutch 27, which couples the internal combustion engine 21 to one of the rotors 24, 25 of the energy converter 23. The second rotor 25, which can be the outer rotor, can be coupled to a wheel axle 28 via a gearbox 29 with continuously variable gear ratio of the type CVT (Continuously Variable Transmission). Continuously variable transmissions are known to the person skilled in the art, and therefore their construction and function will not be described in more detail here.

Figure 5A:
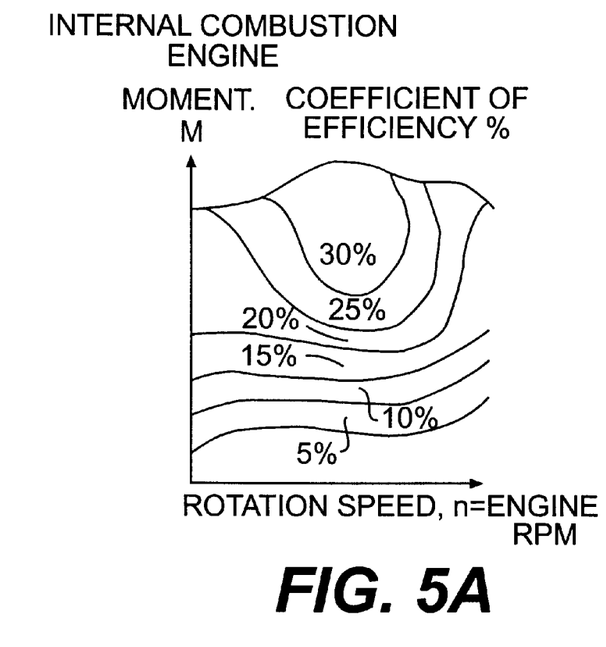
FIGS. 5A–5D show the characteristics of an internal combustion engine in the form of efficiency and emission diagrams.
Figure 5B:
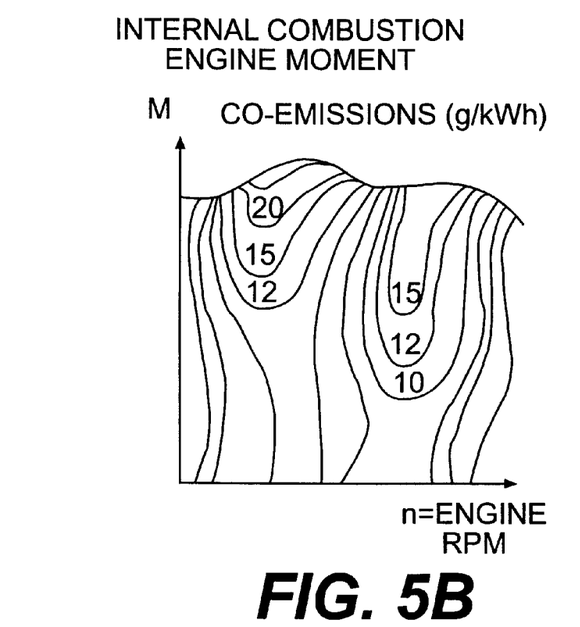
Figure 5C:
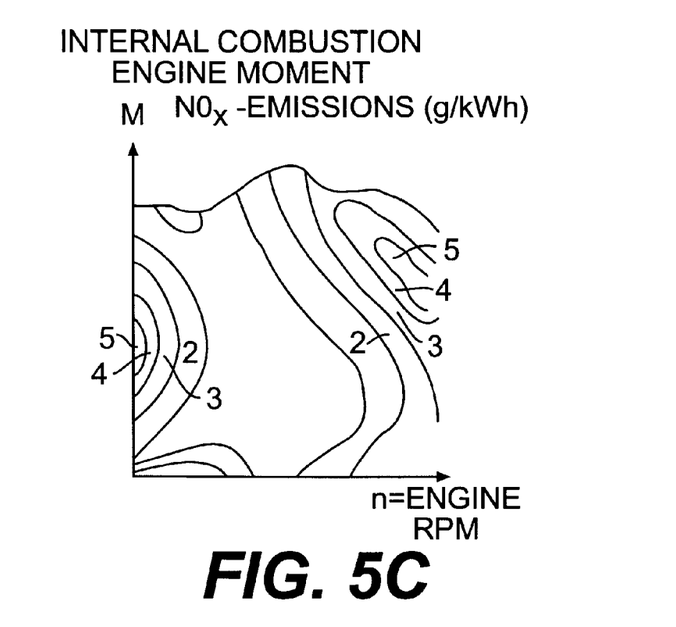
Figure 5D:
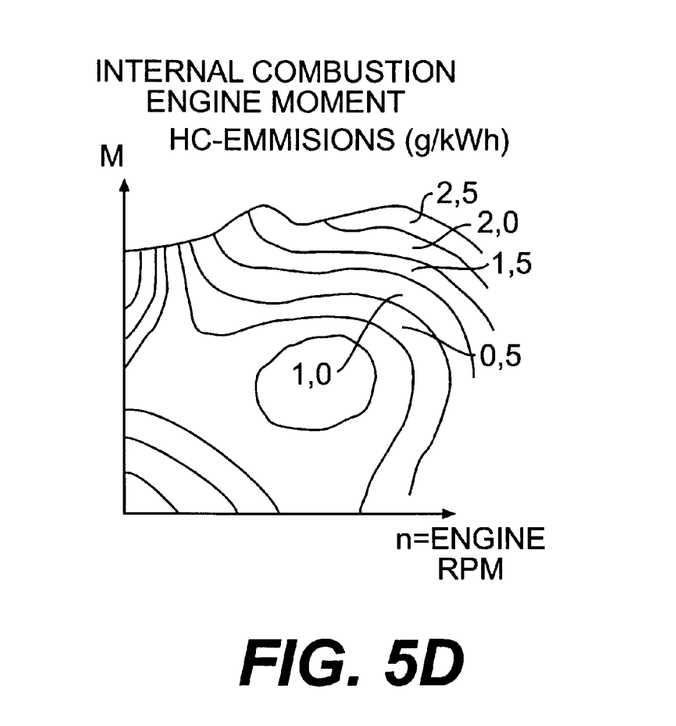

With a CVT connected to the hybrid drive system, the internal combustion engine 21 can be set to work at an rpm and torque which is optimum for efficiency and emissions. This optimum rpm and torque is determined by the characteristics of the internal combustion engine 21, which are obtained by engine testing at different loads on the internal combustion engine 21. Examples of the characteristics of an internal combustion engine are shown in FIGS. 5A–5D in the form of efficiency and emission diagrams. The curves in the diagram shown in FIG. 5A represent various values of the efficiency of an internal combustion engine at various rpms and torques. FIGS. 5B–5D show the curves for CO-, NOx- and HC-emissions, respectively. By combining the hybrid drive system with a CVT, the most advantageous operating condition or operating point of the internal combustion engine 21 for the type of operation in question, can be obtained on the basis of known characteristics of the internal combustion engine 21. Different types of operation can occur, e.g. highway driving or city driving. By coupling a control device according to the present invention to the hybrid drive system and the CVT, the operating properties of a vehicle with the hybrid drive system as a drive source can be optimized for output, efficiency and emissions.

The internal combustion engine 21 thus provides the desired torque for the type of operation in question, and the rpm is controlled in the energy converter 23 to compensate for a change in the rpm of the shaft between the energy converter 23 and the CVT. If the load of the vehicle wheels changes, the fear ratio in the CVT is changed, and the rpm is compensated in the converter 23 so that the set rpm and torque for the internal combustion engine 21 remain constant.

The energy converter 23 is provided with current via a current-converter 30 which converts the direct current from the battery 22 into alternating current. The current-converter 30 is, in accordance with the example, coupled to the outer rotor 25 of the energy converter 23 by means of slip rings 31.

Electrically, the energy converter 23 can be constructed as a permanently magnetized synchronous machine or a separately magnetized synchronous machine with or without brushes. The two rotors 24, 25 of the energy converter 23 can rotate freely, independently of each other. The rotational direction of the outer rotor 25 follows the rotational direction of the inner rotor 24 during hybrid operation, which means that a combination of the internal combustion engine 21 and the energy converter 23 drives the vehicle. For electrical operation, the rotor 24 coupled to the internal combustion engine 21 is locked by means of the clutch 27 and the second rotor 25 can rotate in either rotational direction. The torque of the rotors 24, 25 is equal in magnitude but with opposite signs. The outer rotor 25 is provided with windings which are supplied with current via the slip rings 31, and the inner rotor 24 is provided with permanent magnets.

The power distribution between the internal combustion engine 21 and the battery 22 is controlled by the relative difference in rpm between the outer rotor 25 and the inner rotor 24. The relative difference in rpm can be positive or negative. The sign of the relative difference in rpm is decisive for which mode of operation the system will assume.

A number of different modes of operation can be identified for the hybrid drive system according to the invention:

1) The rpm of outer rotor 25, designated $n_2$ in FIG. 4, is greater than the rpm of the inner rotor 24, designated no. The internal combustion engine 21 and the battery 22 cooperate in this case to drive the vehicle. The wheels of the vehicle rotate at an rpm designated $n_3$. This hybrid mode of operation is useful, e.g. for rapid acceleration of the vehicle or when driving uphill, since the vehicle wheel torque must then be increased, meaning that the CVT must be shifted down. As the CVT has shifted down, $n_2$ increases, which means that there must be a speed change in the energy converter 23 in order to keep the rpm of the internal combustion engine constant.

2) The rpm $n_2$ of the outer rotor 25 is equal to the rpm $n_1$ of the inner rotor 24. This operational mode is of interest in highway driving when the vehicle can be driven solely by the internal combustion engine 21. The battery 22 only supplies a direct current to the winding of the outer rotor to maintain the torque which is required. The battery power is only used to compensate for losses in the energy converter 23.

3) The rpm $n_2$ of the outer rotor 25 is less than the rpm $n_1$ of the inner rotor 24. This operational mode is used primarily to charge the battery 22.

4) The internal combustion engine 21 is not in operation and the inner rotor 24 is stationary while the outer rotor 25 rotates. In this operational mode, the vehicle is driven solely by the energy converter 23 and is thus of interest for operation in cities where there are strict low emission requirements.

5) If a fault should occur in the current-converter 30 or the battery 22, the vehicle can be driven by the internal combustion engine 21 alone. This is made possible by short-circuiting the three-phase winding in the outer rotor by means of a short-circuiting means 32 of variable resistance which can be coupled in series with the three-phase winding to increase the extractable torque. In this operational mode, the outer rotor 25 lags in relation to the inner rotor 24. The amount of lag is dependent on the torque extracted by the wheel axle 28.

6) Furthermore, the internal combustion engine 21 can be started by the battery 22 by first locking the outer rotor 25 to the wheel axle 28 through the CVT and then using the energy converter 23 as a synchronous motor for starting the internal combustion engine 21.

7) Starting the internal combustion engine 21 during electrical operation of the vehicle is done by disengaging the clutch 27 so that the inner rotor 24 can begin rotating and by controlling the current-converter 30 so that the desired starting torque and rpm are transmitted to the internal combustion engine 21. In order to obtain the desired starting torque, energy is supplied to the energy converter 23 from the kinetic energy of the vehicle and from the battery 22.

8) The hybrid drive system can be used as a reserve power source by locking the outer rotor 25 mechanically or by locking the driving axle 28 of the vehicle by means of the vehicle brake system. When the internal combustion engine 21 drives the inner rotor, the energy converter 23 works as a generator. Via the slip rings 31 of the outer rotor, the battery 22 can be charged or current can be extracted externally.

9) Furthermore, a mechanical coupling together of the rotors 24, 25 is possible. This means that $n_2 = n_1$. The vehicle is then propelled only by the internal combustion engine 21. This type of operation is of interest for highway driving to minimize losses in the system since no current from the battery 22 is required to maintain a constant rpm through the energy converter 23.

Figure 6:
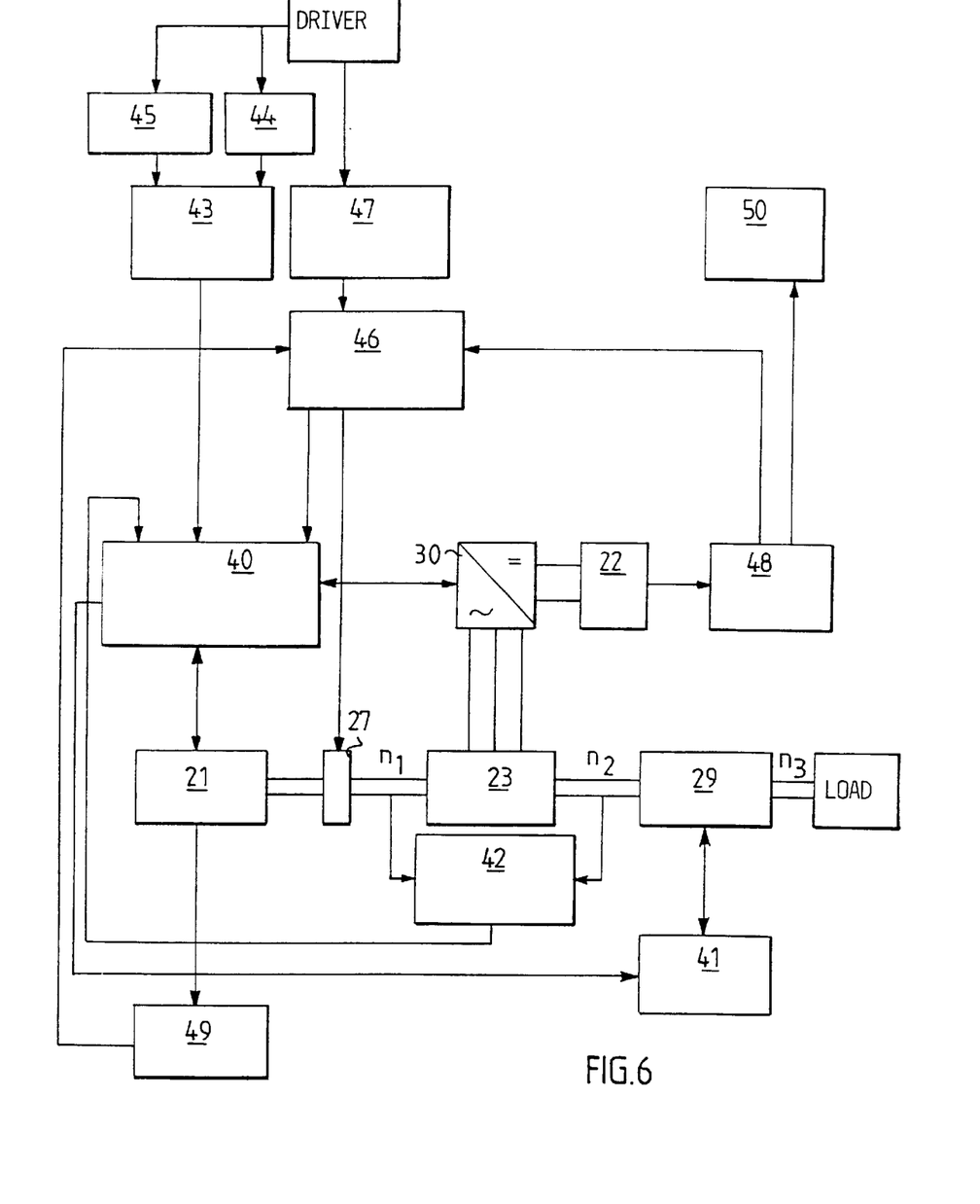
FIG. 6 shows a block diagram of a control device in a hybrid drive system according to the invention.

In order to optimize operational properties and to reduce emissions from the hybrid drive system, a control arrangement is suggested. FIG. 6 shows one embodiment of a control arrangement for a hybrid drive system according to the invention. A control unit 40 for controlling torque and rpm of the internal combustion engine 21 and the energy converter 23 emits and receives signals to and from the internal combustion engine 21 and the current-converter 30 respectively, and emits signals to a transmission control unit 41 which in turn sends signals to a CVT which is connected to one of the rotors 24, 25 of the energy converter. An rpm-estimating unit 42 provides signals for rpm and angular position to the control unit 40 for regulating torque and rpm. The rpm-estimating unit 42 can be made with rpm and angle sensors (not shown) at the rotors 24, 25 of the energy converter to sense the rpm and angular position of the first 24 and second 25 rotors. Alternatively, the rpm-estimating unit 42 can calculate the rpm and angular position from measured currents and voltages. A pedal position sensor 43, which detects the position of an accelerator pedal 44 or a brake pedal 45, sends signals to the control unit 40 for controlling torque and rpm.

A driving strategy unit 46 receives signals concerning suitable driving strategy to be selected by an operator, for example the driver of the vehicle, by means of a control panel 47. The driving strategy unit 46 sends signals to the control unit 40 for regulating torque and rpm and to the clutch 27. The driving strategy unit 46 receives signals from a monitor 48 which monitors the voltage level and the state of a source of direct current, such as a battery 22, and receives signals from a sensor 49 which senses the state of the internal combustion engine 21 as regards emissions, fuel/airmixture, engine temperature etc. A display 50 can be coupled to the monitor 48 to provide the operator with information concerning the condition of the battery 22.

Among the various driving strategies which can be selected from the control panel are hybrid operation, pure internal combustion engine operation and pure electric operation. The driving strategy unit 46 receives the instructions fed via the control panel 47 and provides signals to the various components of the hybrid drive system so that an optimized operational state is obtained as regards to efficiency and emissions. According to one variation of the invention, the control panel 47 permits selection of one of the nine operating modes described above.

Various methods of accelerating and retarding the hybrid drive system according to the present invention will now be explained with reference to FIGS. 4 and 6. When the vehicle is accelerated with the hybrid drive system set for hybrid operation, the rotor 25 coupled to the CVT is accelerated by the kinetic energy of the vehicle when the gear ratio in the CVT is instantaneously increased via the transmission control unit 41. If $n_2$ is greater than $n_1$, the current-converter 30 is controlled by the control unit 40 for regulating torque and rpm so that the rotor 24, which is coupled to the internal combustion engine 21, does not affect the torque and rpm of the internal combustion engine 21 when the rotor 25 coupled to the CVT is accelerated. The battery 22 in this case sends power to the energy converter 23 when the rotor 25 coupled to the CVT accelerates. If $n_2$ is less than $n_1$, the current-converter 30 is controlled so that the charging of the battery 22 is reduced when $n_2$ increases. This results in the torque and the rpm of the wheel axle 28 increasing and leaving the torque and rpm of the internal combustion engine constant. The gear ratio can be increased in small increments or in one large increment so that the desired rpm and/or torque is obtained at the wheels. The torque over the energy converter 23 is constant.

It is furthermore possible to control the torque of the internal combustion engine 21 within an interval, i.e. that the torque of the internal combustion engine 21 is increased somewhat so that the outer rotor 25 is accelerated. If $n_2$ is greater than $n_1$, the current-converter 30 is controlled by the control unit 40 for regulating torque and rpm so that the battery 22 provides current to the energy converter 23 when the outer rotor 25 coupled to the CVT accelerates. If $n_2$ is less than $n_1$, the battery 22 receives power from the energy converter 23. This means that the battery 22 will be charged. By controlling the current-converter 30 by means of the control means, this charging can be reduced when the rpm $n_2$ increases. The gear ratio in the CVT is then increased at the same time as the torque of the internal combustion engine 21 is reduced to its original value. This procedure is repeated until the desired rpm/torque is obtained and so that the efficiency and emissions from the drive system will be optimum.

An additional possibility for achieving acceleration of the hybrid system is obtained by accelerating, with the CVT in its disengaged position, the outer rotor 25 which is coupled to the CVT with the entire power of the internal combustion engine, or alternatively with a free-wheel clutch arranged between the energy converter 23 and the transmission 29. When the outer rotor 25 is accelerated to the desired rpm, the CVT is engaged to accelerate the vehicle. If $n_2$ is greater than $n_1$, the current-converter 30 is controlled by the control unit 40 for torque and rpm control so that the battery 22 provides current to the energy converter 23 when the rotor 25 coupled to the CVT accelerates. If $n_2$ is less than $n_1$, the current-converter 30 is controlled so that the charging of the battery 22 is reduced when $n_2$ increases. If the rotor 25 which is coupled to the CVT should have a higher rpm than is desirable from an electrical point of view, its kinetic energy can be used to accelerate the vehicle by reducing the gear ratio and at the same time controlling the current-converter 30 so that the torque is kept constant and so that the internal combustion engine 21 is not braked.

For regenerative braking and when the hybrid drive system is set for electric operation, the vehicle can be braked by controlling the current-converter 30 so that power is sent to the battery 22 or by downshifting in the CVT so that the rpm $n_2$ of the rotor 25 coupled to the CVT increases due to the kinetic energy of the vehicle. By virtue of the fact that the rotor 25 functions as a flywheel, the vehicle's speed thus decreases. The kinetic energy of the rotor 25 can later be redirected to the wheels to accelerate the vehicle.

If the hybrid drive system is set for hybrid drive, the vehicle can be braked by reducing the gear ratio in the CVT and at the same time controlling the current-converter 30 so that when the rotor 25 retards, the torque and rpm of the internal combustion engine 21 will not be affected. If $n_2$ is greater than $n_1$, the current-converter 30 is controlled so that the battery 22 gives off energy to the converter 23 when the rotor 25 coupled to the CVT is retarded. If $n_2$ is less than $n_1$, the current-converter 30 is controlled so that the charging of the battery 22 increases when $n_2$ decreases.

Figure 7:
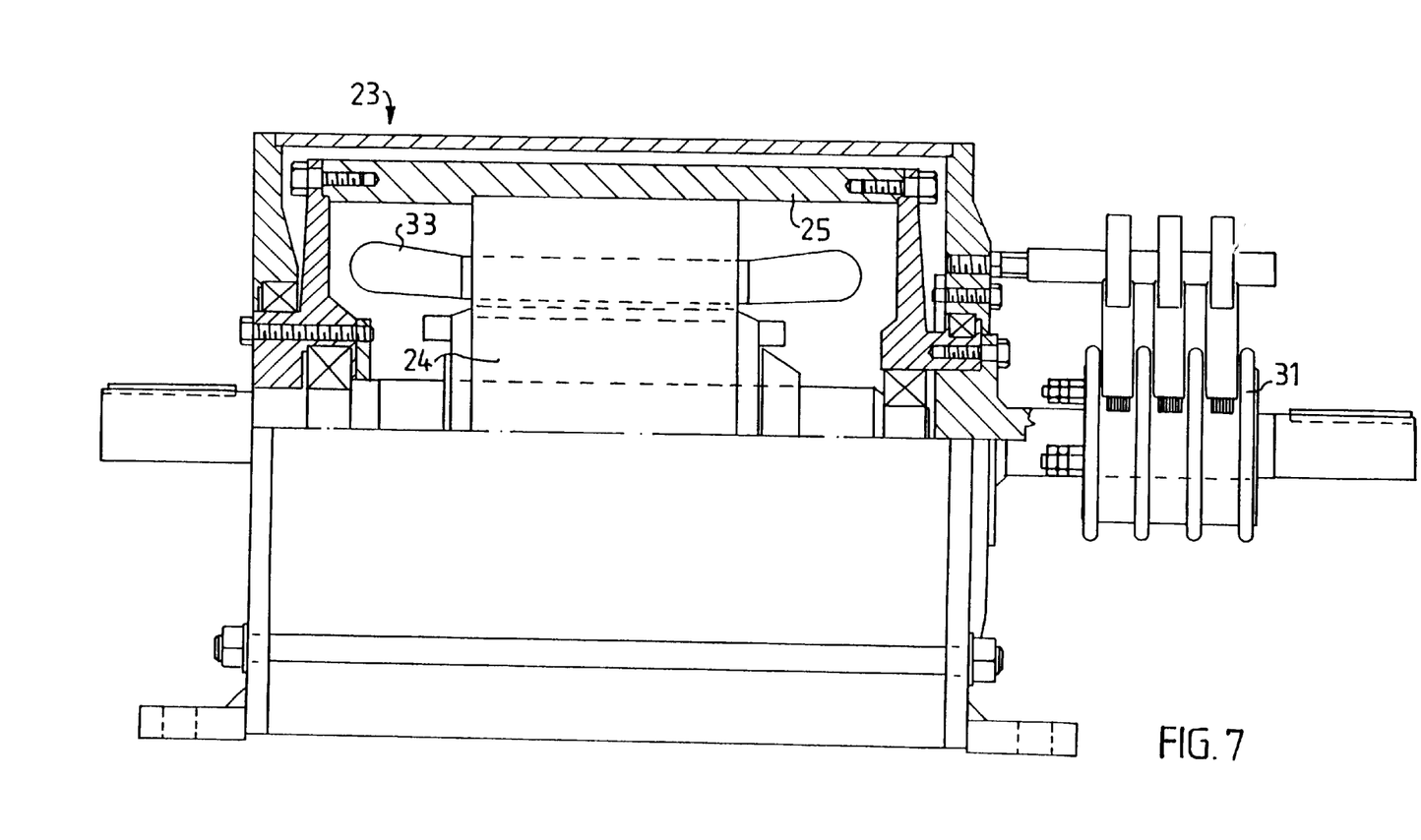
FIG. 7 shows a partially sectioned side view of an energy converter according to the invention.

FIG. 7 shows one example of an energy converter 23 according to the present invention. The outer rotor 25 resembles essentially a stator in a conventional motor but is made to be able to rotate. The outer rotor 25 is provided with one or more windings 33 which are fed with current via slip rings 31. The inner rotor 24 is made with permanent magnets. It can be made so that field weakening can be achieved, which provides increased maximum speed in pure electric operation. The energy converter 23 can also be provided with cooling means to divert the heat generated in the outer rotor 25.

It should be pointed out that the hybrid drive system can be a stationary power source or a power source in a wheeled vehicle or a boat for example, and that the internal combustion engine in the hybrid drive system can be a piston engine or a gas turbine.

What is claimed is:

1. Hybrid drive system comprising: an internal combustion engine with an output shaft, to which output shaft there is connected, via a coupling, an energy converter having first and second rotors, the rotors being rotatable at different speeds in relation to each other, at least one of said rotors being provided with one or more windings, which are supplied with current via a current-converter, the current-converter being supplied with direct current from a direct current source, and a transmission with variable gear ratio coupled to one of the rotors of the energy converter, wherein the transmission and the current-converter cooperate by means of a control arrangement comprising a control unit for controlling rotational speed and torque of the internal combustion engine and for controlling the energy converter.

2. Hybrid drive system according to claim 1, wherein in that the first rotor is provided with permanent magnets and the second rotor is provided with the windings.

3. Hybrid drive system according to claim 1, wherein in that the first rotor is arranged concentrically inside the second rotor and the first rotor is coupled to the output shaft of the internal combustion engine via the coupling and that the second rotor is coupled to the transmission.

4. Hybrid drive system according to claim 1, wherein in that the coupling is a clutch which can be locked and be prevented from rotating.

5. Hybrid drive system according to claim 1, wherein in that the winding is a three-phase winding which is supplied with three-phase current.

6. Hybrid drive system according to claim 5, wherein in that the three-phase winding is provided with engageable short-circuiting means for short-circuiting the three-phase winding.

7. Hybrid drive system according to claim 1, wherein in that the transmission is coupled to an axle of a vehicle.

8. Hybrid drive system according to claim 1, wherein in that the transmission is a continuously variable transmission (CVT).

9. A wheeled vehicle comprising an internal combustion engine with an output shaft, an energy converted coupled to the output shaft via a coupling, the energy converted having first and second rotors, the rotors being rotatable at different speeds in relation to each other, at least one of the rotors being provided with one or more windings which are supplied with current via a current-converter, the current-converter being supplied with direct current from a direct current source, and a transmission with variable gear ratio coupled to one of the rotors of the energy converter, the transmission and the current-converter cooperating by means of a control arrangement comprising a control unit for controlling rotational speed and torque of the internal combustion engine and for controlling the energy converter.

10. Control arrangement for a hybrid drive system, comprising:

a control unit for controlling torque and rotational speed of an internal combustion engine;

an energy converter connected to the internal combustion engine via a clutch, the energy converter having first and second rotors which can be rotated at different speeds relative to each other, at least one of the rotors being provided with one or more windings;

a current converter supplying current to the rotors, the current converter being supplied with current from a direct current source;

a continuously variable transmission coupled to one of the rotors;

rotational speed sensors arranged to sense a rotational speed of the first and seconds rotors, the rotational speed sensors sending signals to a rotational speed-estimating unit which provides signals to the control unit for controlling torque and rotational speed; and a pedal position sensor for detecting a position of a pedal and which sends signal to the control unit, the control unit communicating with the internal combustion engine and the current converter and sending signals to a transmission control unit controlling the continuously variable transmission.

11. Control arrangement according to claim 10, further comprise a driving strategy unit which receives signals concerning a driving strategy, said driving strategy being selected by an operator through a control panel, whereafter the driving strategy unit provides a signal to the control unit for controlling torque and rotational speed and to the clutch, said driving strategy unit receiving signals from a monitor, which monitors the voltage level in the direct current source, and receives signals from a sensor which senses the state of the internal combustion engine.

12. Control arrangement according to claim 10, wherein the first rotor is provided with permanent magnets and the second rotor is provided with the windings.

13. Control arrangement according to claim 10, wherein the first rotor is arranged concentrically inside the second rotor, and the first rotor is coupled to the output shaft of the internal combustion engine via the clutch, and the second rotor is coupled to the transmission.

14. Control arrangement according to claim 10, wherein the clutch can be locked and prevented from rotating.

15. Control arrangement according to claim 10, wherein the winding is a three-phase winding which is supplied with three-phase current.

16. Control arrangement according to claim 15, wherein the three-phase winding is provided with an engageable short-circuiting means to short-circuit the three-phase winding.

17. Control arrangement according to claim 10, wherein the transmission is coupled to an axle of a vehicle.

18. Control arrangement according to claim 10, wherein the transmission is a continuously variable transmission (CVT).

* * * * *